United States Patent [19]

Nishibori et al.

[11] Patent Number: 4,567,242

[45] Date of Patent: Jan. 28, 1986

[54] FLAME RETARDER FOR ORGANIC HIGH MOLECULAR COMPOUNDS PREPARED FROM POLYCONDENSATES OF HALOGENATED PHENOLS

[75] Inventors: Setsuo Nishibori; Hirohito Komori, both of Kyoto; Syuji Saeki, Uji; Hiromitsu Kinoshita, Osaka, all of Japan

[73] Assignee: Dai-Ichi Kogyo Seiyaku Co., Ltd., Kyoto, Japan

[21] Appl. No.: 480,477

[22] Filed: Mar. 30, 1983

[30] Foreign Application Priority Data

Apr. 6, 1982 [JP] Japan .................................. 57-57467

[51] Int. Cl.$^4$ .............................................. C08G 65/48
[52] U.S. Cl. .................................... 525/534; 524/100; 524/142; 524/288; 524/289; 524/327; 524/371; 524/373; 524/408; 524/409; 524/430; 524/434; 525/68; 525/109; 525/132; 525/390; 525/397; 525/535; 528/212

[58] Field of Search ................ 528/212; 524/408, 409, 524/430, 434, 371, 373, 327, 100, 288, 289, 142; 525/68, 109, 132, 534, 390, 397, 535

[56] References Cited

U.S. PATENT DOCUMENTS

| | | | |
|---|---|---|---|
| 4,156,770 | 5/1979 | White | 528/212 |
| 4,156,772 | 5/1979 | Loucks et al. | 528/212 |
| 4,156,773 | 5/1979 | Loucks et al. | 528/212 |
| 4,165,422 | 8/1979 | White | 528/212 |
| 4,341,890 | 7/1982 | Lindvay | 528/212 |
| 4,353,820 | 10/1982 | Lindvay | 528/212 |

Primary Examiner—Lester L. Lee
Attorney, Agent, or Firm—Armstrong, Nikaido, Marmelstein & Kubovcik

[57] ABSTRACT

Compounds useful as flame retarders for organic high molecular compounds are obtained by reacting a polycondensate of a halogenated phenol, e.g. a tribromophenol polycondensate, with a metal compound or organic compound having at least two functional groups capable of reacting with the terminal hydroxyl group of the polycondensate, e.g. an alkaline earth metal halide, an alkyl dihalide or an acyl dihalide.

4 Claims, No Drawings

FLAME RETARDER FOR ORGANIC HIGH MOLECULAR COMPOUNDS PREPARED FROM POLYCONDENSATES OF HALOGENATED PHENOLS

BACKGROUND OF THE INVENTION

The present invention relates to a flame retarder for organic high molecular compounds.

Organic high molecular compounds (hereinafter referred to as "polymeric materials") have been used for various purposes, e.g. household electric appliances, industrial electric devices and parts, textile goods, daily necessaries, interior decorations, building materials and structural materials. Since the polymeric materials are carbon compounds, however, they have a problem of kindling or burning and are restricted in many uses.

Flame retarders are usually employed in order to eliminate such a problem of kindling or burning of polymeric materials, and halogen-containing compounds, phosphorus-containing compounds and nitrogen-containing compounds are known as flame retarders. In many cases, these flame retarders are employed in combination with flame retarding assistants such as antimony trioxide.

In case that these flame retarders are added to polymeric materials, the following troubles often arise.

(a) Uniform mixing is hard to be conducted because of poor compatibility of the flame retarders with the polymeric materials, and accordingly the flame retarding property cannot be effectively exhibited and also the ununiformity exerts a bad influence upon the physical properties of the polymeric materials.

(b) The flame retarders are easy to migrate.

(c) The flame retarders exert a bad influence upon molding processability of the polymeric materials and the mechanical properties of moldings.

(d) The flame retarders hinder the effects of other additives such as plasticizer, lubricant, antioxidant, coloring agent, stabilizer and ultraviolet absorber which are present in the polymeric materials.

It is proposed to employ a high molecular weight compound as a flame retarder in order to eliminate these troubles. For instance, Japanese Unexamined Patent Publication (Tokkyo Kokai) No. 53435/1975 and No. 111546/1979 propose to employ poly(halogenated phenylene oxide) as a flame retarder. However, in case that the poly(halogenated phenylene oxide) is applied to a certain kind of polymeric materials, the following problems may arise.

(a) Flame resistance is insufficient.

(b) Compatibility and heat resistance are bad.

(c) The flame retarder exerts a bad influence upon molding processability of the polymeric materials and mechanical properties of the moldings.

(d) Electric characteristic is lowered. Therefore, the poly(halogenated phenylene oxide) is not still sufficient as a flame retarder.

SUMMARY OF THE INVENTION

The present inventors have made a study on the basis of the thinking that the remaining hydroxyl group of the poly(halogenated phenylene oxide) would exert a bad influence as mentioned above, and have now found that the above-mentioned problems can be solved by masking the remaining hydroxyl group in a specific manner.

In accordance with the present invnetion, there is provided a flame retarder for organic high molecular compounds which comprises a compound prepared by reacting a polycondensate of a halogenated phenol with a member selected from the group consisting of a metal compound and an organic compound, said metal compound and organic compound having at least two functional groups capable of reacting with the terminal hydroxyl group of said polycondensate.

DETAILED DESCRIPTION

The polycondensate of a halogenated phenol used in the present invention is prepared by polycondensing one or more kinds of halogenated phenol, for instance, in the presence of an alkali metal hydroxide and a metal catalyst such as copper or iron in a solvent or in the absence of a solvent. The polycondensate has unreacted terminal hydroxyl group. Examples of the halogenated phenol are, for instance, monobromophenol, dibromophenol, tribromophenol, tetrabromophenol, pentabromophenol, dibromocresol, monochlorophenol, dichlorophenol, trichlorophenol, tetrachlorophenol and pentachlorophenol.

In the present invnetion, (A) a metal compound having at least two functional groups capable of reacting with the terminal hydroxyl group of the polycondensate and/or (B) an organic compound having at least two functional groups capable of reacting with the terminal hydroxyl group of the polycondensate are employed in order to cause to react with the terminal hydroxyl group of the polycondensate.

As a metal compound (A), halides of metals such as magnesium, aluminum, calcium, antimony, tin and barium are employed in the present invention. Typical examples of the metal compound (A) are magnesium chloride, aluminum bromide, calcium chloride, antimony chloride, tin chloride and barium chloride.

The organic compounds (B) include, for instance, alkyl dihalides, acyl dihalides, haloacyl dihalides, phosphoro dihalodate, cyanuric halides, other organic compounds having active halogens, polyepoxy compounds, and the like. Typical examples of the organic compounds (B) are ethylene dibromide, ethylene dichloride, dichlorodiethyl ether, maleoyl dichloride, terephthaloyl dichloride, tetrabromophthaloyl chloride, phenylphosphoro dichloridate, phenylphosphonic dichloride, dibromocresylphosphoro dichloridate, chlorophenylphosphonic dichloride, cyanuric chloride, and compounds of the following formulas (I) to (VII):

$$BrCH_2CH_2-A\pm CH_2CH_2-A\overline{)_n}CH_2CH_2Br \quad (I)$$
$$ClCH_2CH_2OCH_2CH_2O-A\pm CH_2CH_2OCH_2CH_2-A\overline{)_n} \quad (II)$$
$$-CH_2CH_2OCH_2CH_2Cl$$

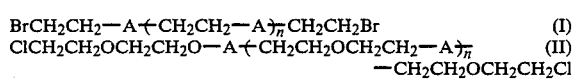

(III)

(IV)

(V)

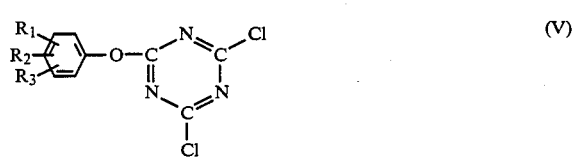

-continued

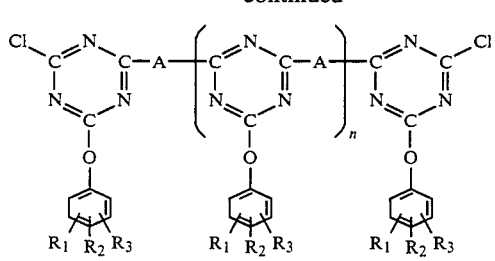
(VI)

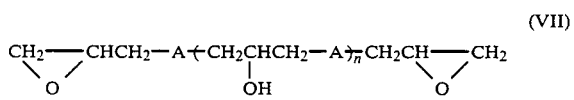
(VII)

wherein $R_1$, $R_2$ and $R_3$ are hydrogen atom, chlorine atom, bromine atom or an alkyl group having 1 to 4 carbon atoms, n is 0 or an integer of 1 to 40, and A is a bivalent group of the formula:

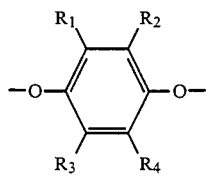

wherein $R_1$, $R_2$, $R_3$ and $R_4$ are hydrogen atom, chlorine atom, bromine atom or an alkyl group having 1 to 4 carbon atoms, or a bivalent group of the formula:

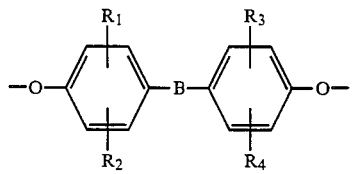

wherein $R_1$, $R_2$, $R_3$ and $R_4$ are as defined above, and B is —O—, —S—, —C(CH$_3$)$_2$—, —SO$_2$— or —CH$_2$—.

In case that the metal compound (A) or organic compound (B) has the functionality of not less than three, the halogenated phenol polycondensate may be employed in combination with a small amount of a halogenated phenol, a halogenated alcohol or a halogenated amine.

The reaction of the halogenated phenol polycondensate with the metal compound (A) or the organic compound (B) is carried out (a) in the presence of an alkali metal hydroxide with or without a solvent such as benzene, toluene, xylene, methylene dichloride, chloroform or carbon tetrachloride, or (b) in a nonpolar solvent in the presence of a Lewis acid such as BF$_3$. The reaction is usually carried out at a temperature of 20° to 90° C. for 0.5 to 4 hours. The metal compound (A) or organic compound (B) is employed in an amount of chemical equivalent or slight excess for the halogenated phenol polycondensate.

The reaction product of the present invention is very useful as a flame retarder for polymeric materials. The polymeric materials to which the flame retarder of the invention is applied are not particularly limited. For instance, the flame retarder of the invention is appliable to polystyrene, polyethylene, polypropylene, acrylonitrile-butadiene-styrene resin, acrylic resins, vinyl chloride resins, polyphenylene oxide, polycarbonate, polyamide, saturated or unsaturated polyester, melamine resin, epoxy resin, phenol resin and cellulosic materials.

The amount of the flame retarder of the present invention added to the polymeric materials is not particularly limited, but preferably, it is employed in an amount of 2 to 50% by weight of the polymeric material. The flame retarder of the invention may be employed in the form of a solid, a solution in a solvent such as methylene dichloride or chloroform, or an emulsion in water or an oil such as turpentine oil, tall oil, coconut oil, tung oil, palm oil, linseed oil or castor oil. The flame retarder is added to polymeric materials, for instance, at the time of polymerization, molding or spinning, or an another occasion of mixing.

The flame retarder of the present invention may be employed in combination with known flame retarders and/or flame retarding assistances, e.g. halogen-containing alkyl phosphates, halogen-containing alkyl phosphites, metal oxides, metal hydroxides and alkyl metals. Also, the flame retarder of the invention may be employed in combination with other known additives such as stabilizer, coloring agent, an agent for imparting weatherability, delustering agent, antistatic agent and filler without losing the effect of these additives.

When the flame retarder of the present invention is employed for imparting flame resistance to polymeric materials, it shows excellent features such that it is excellent in flame resistance, compatibility, weatherability and heat resistance, the migration thereof in the polymeric materials is very small, it does not exert a bad influence upon molding processability of the polymeric materials and mechanical properties of the moldings, and electric characteristic is not lowered. Therefore, the flame resistant polymeric materials added with the flame retarder of the invention can be used, for instance, as moldings, films, foams, coating materials such as paints, fibrous materials and liminates.

The present invention is more specifically described and explained by means of the following Examples, in which all parts and % are by weight unless otherwise noted. It is to be understood that the present invention is not limited to the Examples, and various changes and modifications may be made in the invention without departing from the spirit and scope thereof.

EXAMPLE 1

A 500 ml. four neck flask was charged with 80 g. of tribromophenol polycondensate having an acid value of 35.2 (average molecular weight: about 1,600), 200 ml. of chloroform and 4 g. of a 50% aqueous solution of NaOH, and the reaction was carried out. To the flask was gradually added 26 g. of a 20% aqueous solution of BaCl$_2$, and the reaction was carried out at 25° C. for 1 hour with agitation. After the completion of the reaction, the reaction mixture was washed with water to remove the by-produced salt, and was then dried to give a compound having the following presumed structure. The bromine content of the compound was 64.1%.

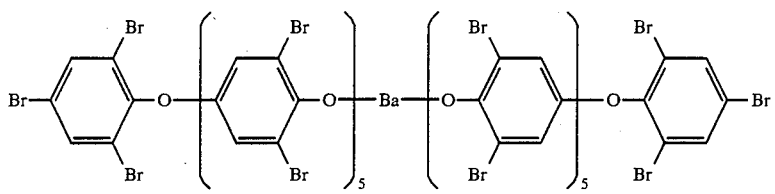

EXAMPLE 2

A flask was charged with 70 g. of tribromophenol polycondensate having an acid value of 20 (average molecular weight: about 2,800), 4.2 g. of tribromophenol, 200 ml. of chloroform and 3 g. of a 50% aqueous solution of NaOH, and the reaction was conducted. To the flask was added 2.9 g. of SbCl$_3$, and the reaction was carried out at 25° C. for 1 hour with agitation. After the completion of the reaction, the reaction mixture was washed with water and dried to give a compound having the following presumed structure. The bromine content of the compound was 64.1

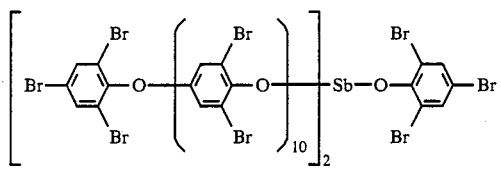

EXAMPLE 3

A flask was charged with 80 g. of tribromophenol polycondensate having an acid value of 35.2 (average molecular weight: about 1,600), 200 ml. of toluene and 4.2 g. of a 50% aqueous solution of NaOH, and the reaction was conducted. To the flask was added 4.7 g. of ethylene dibromide, and the reaction was carried out under reflux with agitation for 24 hours. The reaction mixture was washed with water, and the toluene layer was separated and added dropwise to 500 ml. of methanol to crystallize the product. The crystals were separated and dried to give a compound having the following presumed structure. The bromine content of the compound was 65.2%.

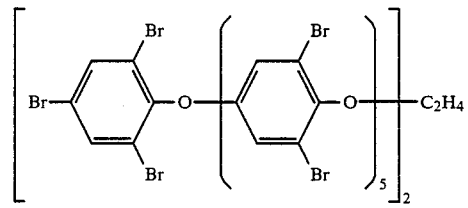

EXAMPLE 4

A flask was charged with 86 g. of pentabromophenol polycondensate having an acid value of 6.5 (average molecular weight: about 8,600), 200 ml. of toluene and 1 g. of a 50% aqueous solution of NaOH, and the reaction was conducted. To the flask was added 0.75 g. of dichlorodiethyl ether. The reaction and the recovery were conducted in the same manner as in Example 3 to give a compound having the following presumed structure. The bromine content of the compound was 78.3%.

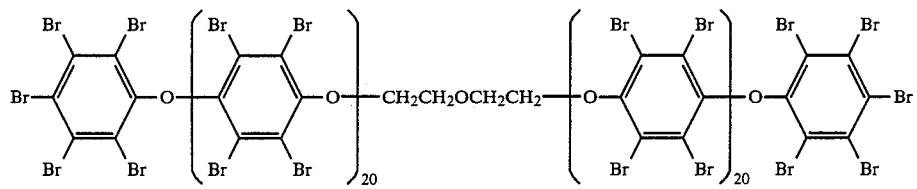

EXAMPLE 5

A flask was charged with 40 g. of tribromophenol polycondensate having an acid value of 14 (average molecular weight: about 4,000), 26 g. of trichlorophenol polycondensate having an acid value of 21.5 (average molecular weight: about 2,600), 200 ml. of toluene and 1.8 g. of a 50% aqueous solution of NaOH, and the reaction was conducted. To the flask was added 6.4 g. of bis(bromoethyl) tetrabromophenylene ether. The reaction and the recovery were conducted in the same manner as in Example 3 to give a compound having the following presumed structure. The content of a halogen calculated as bromine was 78.1%.

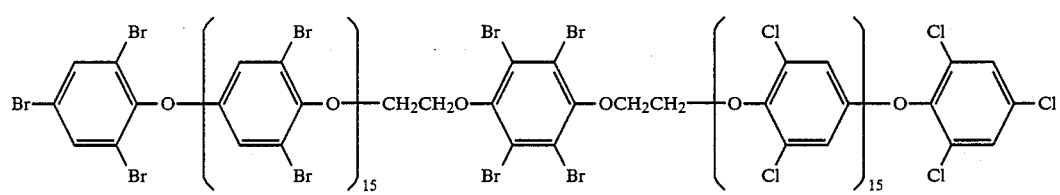

EXAMPLE 6

A flask was charged with 70 g. of tribromophenol polycondensate having an acid value of 20 (average molecular weight: about 2,800), 200 ml. of toluene and 2.2 g. of a 50% aqueous solution of NaOH, and the reaction was conducted. To the flask was added 9.8 g. of bis(bromoethyloxydibromophenyl)sulfone. The reaction and the recovery were conducted in the same manner as in Example 3 to give a compound having the following presumed structure. The bromine content of the compound was 63.7%.

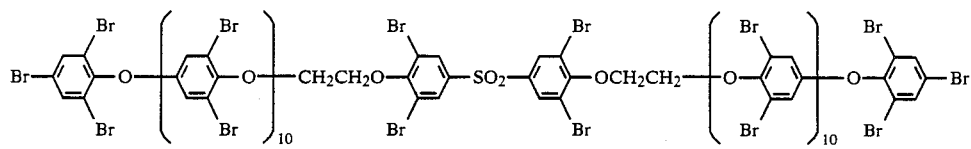

EXAMPLE 7

A flask was charged with 85 g. of tribromophenol polycondensate having an acid value of 16.5 (average molecular weight: about 3,400), 200 ml. of methylene dichloride and 2 g. of a 50% aqueous solution of NaOH, and the reaction was conducted. To the flask was added 2.6 g. of terephthaloyl dichloride, and the reaction was carried out at 40° C. for 1 hour with agitation. The reaction mixture was sufficiently washed with 1% aqueous ammonia, and the methylene dichloride layer was added dropwise to 1,000 ml. of methanol to precipitate the product. The crystals were separated and dried to give a compound having the following presumed structure. The bromine content of the compound was 63.6%.

ride and 0.8 g. of a 50% aqueous solution of NaOH, and the reaction was conducted. To the flask was added 2.1 g. of terephthaloyl dichloride, and the mixture was agitated for 30 minutes. To the flask was then added 78 g. of tribromophenol polycondensate having an acid value of 7 (average molecular weight: about 7,800), and after dissolving it, 5 g. of triethylamine was added to the flask. The reaction was then carried out at 40° C. for 1 hour. The reactin mixture was sufficiently washed with 1% aqueous ammonia, and the methylene dichloride layer was added dropwise to 1,000 ml. of methanol to precipitate the product. The crystals were then separated and dried to give a compound having the following presumed structure. The bromine content of the compound was 63.6%.

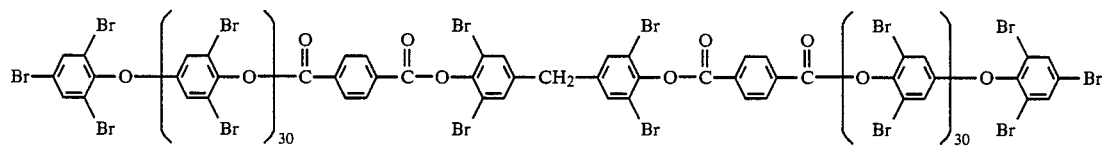

EXAMPLE 9

A flask was charged with 57.5 g. of tribromophenol polycondensate having an acid value of 24 (average molecular weight: about 2,300), 4 g. of tribromophenol, 100 ml. of toluene, 50 ml. of dimethylformamide and 3 g. of a 50% aqueous solution of NaOH, and the reaction was conducted. To the flask was added 2.3 g. of cyanuric chloride. The temperature was gradually elevated, and the reaction was carried out at 100° C. for 10 hours with agitation. The product was recovered and dried in the same manner as in Example 3 to give a compound having the following presumed structure.

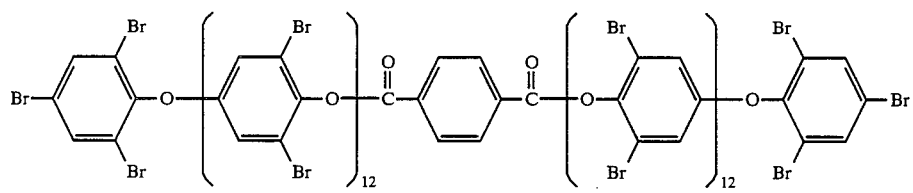

EXAMPLE 8

A flask was charged with 2.6 g. of bis(hydroxydibromophenoxy)methane, 200 ml. of methylene dichlo- The bromine content of the compound was 64.7%.

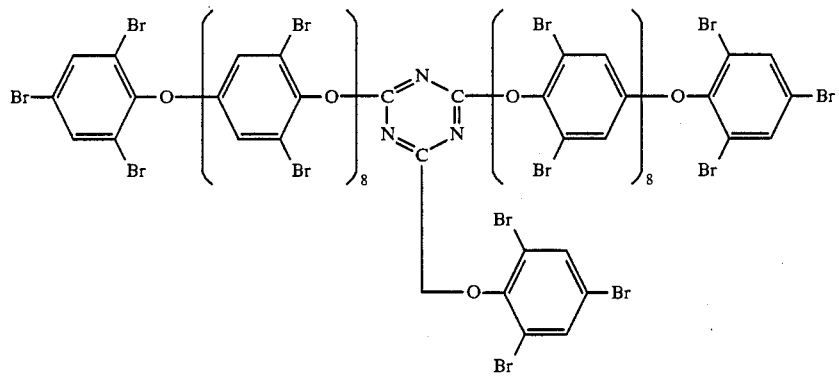

EXAMPLE 10

A flask was charged with 40 g. of tribromophenol polycondensate having an acid value of 67.5 (average molecular weight: about 800), 16.5 g. of tribromophenol, 13.6 g. of tetrabromobisphenol, 100 ml. of toluene, 50 ml. of dimethylformamide and 12 g. of a 50% aqueous solution of NaOH, and the reaction was conducted. To the flask was then added 9.2 g. of cyanuric chloride, and the reaction and recovery were conducted in the same manner as in Example 9 to give a compound having the following presumed structure. The bromine content of the compound was 63.6%.

EXAMPLE 12

To 100 parts of HI-polystyrene were added 15 parts of the compound obtained as a flame retarder in Example 2 and 5 parts of antimony trioxide, and they were kneaded at 200° C. for 6 minutes. The mixture was molded by injection molding to give test specimens having a size of 127 mm.×12.7 mm.×3.2 mm., and the specimens were subjected to the flame resistance test and weathering test.

The flame resistance test was carried out according to UL-94 (⅛ inch), and the average flaming time (second), total glowing time (second) and dripping were estimated.

The weathering test was carried out by employing a fade-o-meter. After irradiating xenon discharge light to the specimens for 12 hours, the change in appearance of the specimens was observed and estimated.

The results are shown in Table 1.

EXAMPLES 13 AND 14 AND COMPARATIVE EXAMPLES 1 AND 2

The procedures of Examples 12 were repeated except that as a flame retarder, there was employed the compound obtained in Example 3 (Example 13), the compound obtained in Example 9 (Example 14), decabromodiphenyl ether (Comparative Example 1) or a polycondensate of 10 molecules of tribromophenol (hereinafter referred to as "tribromophenol polycondensate") (Comparative Example 2).

The results are shown in Table 1.

EXAMPLE 11

A flask was charged with 85 g. of tribromophenol polycondensate having an acid value of 16.5 (average molecular weight: about 3,400), 200 ml. of toluene, 20 ml. of isopropyl alcohol and 2 g. of a 50% aqueous solution of NaOH, and the reaction was conducted. To the flask was then added 2.6 g. of phenylphosphoro dichloridate, and the reaction was carried out at 20° C. for 1 hour with agitation. The recovery of the product was conducted in the same manner as in Example 7 to give a compound having the following presumed structure. The bromine content of the compound was 63.9%.

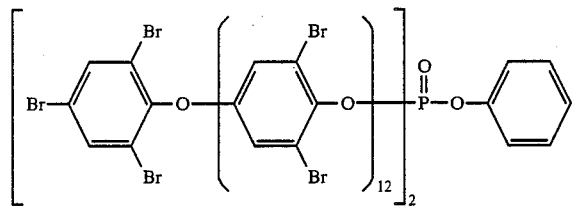

TABLE 1

| | Flame retarder | Flame resistance Average flaming time (sec.) | Total glowing time (sec.) | Dripping | Estimation | Weatherability |
|---|---|---|---|---|---|---|
| Ex. 12 | Example 2 | 5.2 | — | none | V-0 | no change |
| Ex. 13 | Example 3 | 3.5 | — | none | V-0 | no change |
| Ex. 14 | Example 9 | 6.8 | — | none | V-0 | no change |
| Com. Ex. 1 | Decabromo-diphenyl ether | 17.4 | — | none | V-1 | yellowing |
| Com. Ex. 2 | Tribromophenol polycondensate | 23.4 | 90 | none | nonstandard | slightly yellowing |

EXAMPLES 15 TO 17 AND COMPARATIVE EXAMPLES 3 AND 4

The procedures of Example 12 were repeated except that 100 parts of an acrylonitrile-butadiene-styrene resin was employed instead of the HI-polystyrene and 15 parts of the flame retarder shown in Table 2 were employed.

The results of the flame resistance test are shown in Table 2.

TABLE 2

| | Flame retarder | Flame resistance Average flaming time (sec.) | Total glowing time (sec.) | Dripping | Estimation |
|---|---|---|---|---|---|
| Ex. 15 | Example 1 | 14.5 | 35 | none | V-1 |
| Ex. 16 | Example 3 | 10.2 | 50 | none | V-1 |
| Ex. 17 | Example 6 | 18.4 | 48 | none | V-1 |
| Com. Ex. 3 | Dodecabromo-diphenyl ether | 18.2 | 42 | none | V-1 |
| Com. Ex. 4 | Tribromophenol polycondensate | 22.6 | 85 | none | nonstandard |

EXAMPLES 18 TO 20 AND COMPARATIVE EXAMPLES 5 TO 6

To 100 parts of polystyrene were added 10 parts of the flame retarder shown in Table 3 and 3 parts of antimony trioxide, and they were kneaded at 170° C. for 5 minutes. The mixture was molded by injectin molding to give test specimens having a size of 150 mm.×6.5 mm.×3.2 mm. The specimens were subjected to the flamability test and migration test.

The flamability test was carried out according to JIS K-7201, and the limited oxygen index was measured.

The migration test was carried out by subjecting specimens having a size of 150 mm.×50 mm.×3.0 mm. to exposure test at 70° C. for 168 hours and observing blooming of the specimens by the naked eye.

The results are shown in Table 3.

TABLE 3

| | Flame retarder | Limited oxygen index (%) | Migration |
|---|---|---|---|
| Ex. 18 | Example 2 | 23.7 | none |
| Ex. 19 | Example 4 | 23.2 | none |
| Ex. 20 | Example 5 | 23.2 | none |
| Com. Ex. 5 | Dodecabromo-diphenyl ether | 24.6 | blooming |
| Com. Ex. 6 | Tribromophenol polycondensate | 22.8 | slightly blooming |

EXAMPLES 21 TO 23 AND COMPARATIVE EXAMPLE 7

To 100 parts of polyethylene terephthalate were added 5 parts of barium metasilicate and 9 parts of the flame retarder shown in Table 4, and they were kneaded at 260° C. Test specimens having a size of 127 mm.×12.7 mm. ×1.6 mm. were prepared according to JIS K-6911, and were subjected to the flame resistance test, migration test and the measurement of tensile strength and bending strength.

The flame resistance test was carried out according to UL-94 (1/16 inch).

The tensile strength and bending strength were measured according to JIS K-6911.

The results are shown in Table 4.

TABLE 4

| | Flame retarder | Flame resistance | Migration | Tensile strength (kg./cm.$^2$) | Bending strength (kg./cm.$^2$) |
|---|---|---|---|---|---|
| Ex. 21 | Example 7 | V-0 | none | 490 | 980 |
| Ex. 22 | Example 8 | V-0 | none | 505 | 995 |
| Ex. 23 | Example 9 | V-0 | none | 495 | 995 |
| Com. Ex. 7 | Tribromo-phenol polycondensate | V-0 | slightly blooming | 350 | 800 |

EXAMPLE 24 AND COMPARATIVE EXAMPLE 8

To 90 parts of polyamide were added 10 parts of polycarbonate, 5 parts of the flame retarder shown in Table 5 and 2 parts of antimony trioxide. They were kneaded at 260° C., and test specimens were prepared from the mixture. The flame resistance, tensile strength, bending strength and weatherability were measured.

The flame resistance test was carried out according to UL-94 (1/8 inch).

The tensile strength and bending strength were measured according to JIS K-6911.

The weatherability was measured by irradiating xenon discharge light to the specimens for 150 hours in a fade-O-meter and observing the appearance of the specimens.

The results are shown in Table 5.

TABLE 5

| | Flame retarder | Flame resistance | Tensile strength (kg./cm.$^2$) | Bending strength (kg./cm.$^2$) | Weatherability |
|---|---|---|---|---|---|
| Ex. 24 | Example 3 | V-1 | 980 | 1120 | no change |
| Com. Ex. 8 | Tribromo-phenol polycon- | V-1 | 700 | 860 | yellowing |

TABLE 5-continued

| Flame retarder | Flame resistance | Tensile strength (kg./cm.$^2$) | Bending strength (kg./cm.$^2$) | Weatherability |
|---|---|---|---|---|
| densate | | | | |

EXAMPLES 25 TO 27 AND COMPARATIVE EXAMPLE 9

To 100 parts of a commercially available phenol resin varnish (solid content: 60%) were added 10 parts of the flame retarder shown in Table 6, 3 parts of antimony trioxide and 30 parts of tricresyl phosphate. After admixing them, a cotton linter paper was impregnated with the varnish so that the resin content became 45%, and was dried to give a resin-impregnated paper.

Seven sheets of the resin-impregnated paper were laminated and pressed at 160° C. and 80 kg./cm.$^2$ for 50 minutes to give a laminated board having a thickness of 1.6 mm. With respect to the thus obtained laminated board, the flame resistance, insulation property, heat resistance, punching quality, interlaminar adhesion property and the state of the surface finishing were examined.

The flame resistance was measured according to UL-94 (1/16 inch).

The insulatin property was measured with respect to the specimens treated with boiling water according to JIS C-6481.

The heat resistance was measured according to JIS C-6481.

The punching quality test was conducted according to ASTM D 617.

The interlaminar adhesion property and the state of the surface finishing were observed and estimated by the naked eye.

The results are shown in Table 6.

TABLE 6

| | Flame retarder | Flame resistance | Insulation resistance (Ω) | Heat resistance °C. | Heat resistance min. | Punching quality | Interlaminer adhesion property | Surface finishing state |
|---|---|---|---|---|---|---|---|---|
| Ex. 25 | Example 5 | V-0 | $10^7$–$10^9$ | 210 | 30 | very good at 70° C. | good | good |
| Ex. 26 | Example 6 | V-0 | $10^7$–$10^9$ | 210 | 30 | very good at 70° C. | good | good |
| Ex. 27 | Example 8 | V-0 | $10^7$–$10^9$ | 210 | 30 | very good at 70° C. | good | good |
| Com. Ex. 9 | Tribromophenol polycondensate | V-0 | $10^6$–$10^8$ | 200 | 30 | bad at 80° C. | peeling | presence of spots |

EXAMPLE 28

There were thoroughly admixed 40 parts of the flame retarder obtained in Example 11, 10 parts of tricresyl phosphate, 5 parts of a non-ionic surface active agent (commercial name "NOIGEN ET-180" made by Dai-Ichi Kogyo Seiyaku Co., Ltd.), 20 parts of trimethylolmelamine, 2 parts of diammonium hydrogenpohosphate and 110 parts of water to give an emulsion. A cotton cloth having a basis weight of 127.0 g./m.$^2$ was impregnated with the emulsion, squeezed up to weight increase of 80% and dried at 80° C. for 10 minutes. The impregnated cloth was then cured at 140° C. for 5 minutes and was subjected to the flamability test and the washing test.

The flamability test was conducted according to JIS A-8952. The estimation was passing.

The result of the washing test was good. The treated cloth was washed 10 times according to JIS L-1004. The weight decrease was less than 5%. The treated cloth was also dry-cleaned 10 times according to JIS L-860. The weight decrease was less than 5%.

In addition to the ingredients used in the Examples, other ingredients can be used in the Examples as set forth in the specification to obtain substantially the same results.

What we claim is:

1. A flame retarder for organic high molecular compounds which comprises a compound prepared by reacting a polycondensate of a halogenated phenol with a member selected from the group consisting of a metal compound and an organic compound, said metal compound and organic compound having at least two functional groups capable of reacting with the terminal hydroxyl group of said polycondensate.

2. The flame retarder of claim 1, wherein said halogenated phenol is a member selected from the group consisting of monobromophenol, dibromophenol, tribromophenol, tetrabromophenol, pentabromophenol, dibromocresol, monochlorophenol, dichlorophenol, trichlorophenol, tetrachlorophenol and pentachlorophenol.

3. The flame retarder of claim 1, wherein said metal compound is a member selected from the group consisting of magnesium halides, aluminum halides, calcium halides, antomony halides, tin halides and barium halides.

4. A flame retarder for organic high molecular compounds which comprises a compound prepared by reacting a polycondensate of a halogenated phenol with an organic compound selected from the group consisting of alkyl dihalides, acyl dihalides, haloacyl dihalides, phosphoro dihalodate, cyanuric halides and a polyepoxy compound.

* * * * *